United States Patent [19]
Hashiue

[11] 3,921,029

[45] Nov. 18, 1975

[54] COLOR IMAGE DISPLAYING DEVICE

[75] Inventor: Masakazu Hashiue, Asaka, Japan

[73] Assignee: Fuji Shashin Film Kabushiki Kaisha, Japan

[22] Filed: Sept. 17, 1973

[21] Appl. No.: 397,869

Related U.S. Application Data

[63] Continuation of Ser. No. 183,568, Sept. 24, 1971, abandoned.

[30] Foreign Application Priority Data

Oct. 1, 1970 Japan .................................. 45-86243

[52] U.S. Cl. ........................................ 315/30; 328/2

[51] Int. Cl.² .......................................... H01J 29/52

[58] Field of Search ................. 315/21, 30, 11, 3, 4; 328/2

[56] References Cited

UNITED STATES PATENTS

| | | | |
|---|---|---|---|
| 2,634,372 | 4/1953 | Salisbury | 315/4 X |
| 2,688,107 | 8/1954 | Salisbury | 315/4 |
| 3,097,324 | 7/1963 | Salisbury | 315/4 X |
| 3,366,829 | 1/1968 | Clapp | 315/3 |
| 3,462,642 | 8/1969 | Ketchpel | 315/30 |
| 3,524,011 | 8/1970 | Korpel | 178/5.4 |
| 3,577,031 | 5/1971 | Welsh et al. | 315/13 CG |
| 3,730,979 | 5/1973 | Schwarz et al. | 178/5.4 |
| 3,747,022 | 7/1973 | Nanamatsu et al. | 332/7.51 |

OTHER PUBLICATIONS

Modulation of an Electron Wave by a light Wave, Schwarz et al., Appl. Phys. Letters, Vol. 15, No. 11, 1 Dec. 1969, pp. 349–351.

Coherence of Matter in the Effect of Electron Waves Modulated by Laser Beams in Solids, Hora, Appl. Phys. Letters, pp. 131–136.

Am. Inst. of Phys. Hdbk., McGraw–Hill Book Co., Inc., N.Y., N.Y., 2nd Ed. (1963), pp. 6–184.

*Primary Examiner*—Stephen C. Bentley
*Assistant Examiner*—P. A. Nelson
*Attorney, Agent, or Firm*—Stevens, Davis, Miller & Mosher

[57] ABSTRACT

A color image displaying picture tube having no fluorescent dots or stripes on the face plate. The electron beam in the tube is light modulated with a light wave and demodulated on the face plate to emit a light corresponding to the modulating light wave. The electron beam modulated with a red light emits a red light on the face plate.

3 Claims, 6 Drawing Figures

COLOR IMAGE DISPLAYING DEVICE

This is a continuation of application Ser. No. 183,568, filed Sept. 24, 1971, now abandoned.

BACKGROUND OF THE INVENTION

1. Field of the Invention

This invention relates to a device for displaying a color image, and more particularly to a displaying device for a color television in which no image screen is necessitated such as a shadow mask, a color grid, a fluorescent screen emitting lights of three primary colors of red, green and blue.

2. Description of the Prior Art

In the conventional cathode ray tube for a color television, a fluorescent screen for emitting three primary colors of red, green and blue is scanned by an electron beam emitted according to signals corresponding to the respective colors. The inner surface of the face plate of the cathode ray tube, therefore, should be provided with three kinds of fluorescent elements emitting three colors respectively arranged in accordance with a definite pattern. Accordingly, the pattern of the respective colors is preferred to be made by means of an electron beam emitted under the same state as that under which the cathod ray tube practically assembled is energized. And an extremely high technique is required therefor.

Conventional color picture tubes are broadly classified structurally into a shadow mask type color tube, a chromatron tube, an apple tube and the "Trinitron" tube (trade mark of SONY: a single electron gun type cathode ray tube having a plurality of filaments). These types of color picture tube may be described briefly as below.

In the shadow mask type color tube, a large number of sets of fluorescent dots to emit lights of the three primary colors of R, G and B cover the entire area of the face plate, each set of fluorescent dots having a microfine structure of a degree which cannot be identified from the optimum viewing distance from the face of the picture tube. The electrons discharged from suitably arranged three electron guns concentrate to a point on a shadow mask disposed on the near side of the fluorescent screen. After passing through an aperture in the shadow mask, the three electron beams proceed in three directions and impinge upon the R, G and B fluorescent elements. Each electron beam is modulated by the corresponding color signal.

In the chromatron tube, stripes of fluorescent elements are coated in parallel, side-by-side relation in such a manner that R and B fluorescent stripes are alternately located on both sides of the G fluorescent stripe, such as R, G, B, R, G, B . . . . Electric signals are applied on a group of two types of filament grids arranged at the same pitch as the R and B fluorescent stripes and the electron beams from a single electron gun are distributed to the R, G and B fluorescent elements.

The apple tube, similar to the chromatron tube, comprises parallel stripes of three primary color fluorescent elements and a single electron gun, but no shadow mask nor color lattice is disposed in front of the inner surface of the fluorescent screen and instead, filaments of magnesium oxide, which is large in secondary electron emitting ratio, are provided on the fluorescent screen. The secondary electrons are collected on the tube wall and provide synchronizing pulses for applying R, G and B color signals sequentially on the electron gun.

The "Trinitron" tube has a three electron beam emitting electron gun and a devise is made at the electron gun portion, but requires parallel stripes of fluorescent elements or fluorescent dots.

As may be understood from the foregoing, in any of the conventional color picture tubes it is essential that fluorescent elements to emit lights of the three primary colors of R, G and B are arranged in a complicated pattern according to the particular type of the tube, and there is the disadvantage that the process for obtaining the image screen comprising these fluorescent elements is very complicated and requires a high degree of skill. Furthermore, the dots or parallel stripes of fluorescent elements degrade the quality of the picture in respect of image sharpness, even though they have a microfine structure of a degree hardly identifiable from the optimum viewing distance from the face plate.

Moreover, even if attempt is made to improve the image quality by increasing the number of rasters in a shadow mask type color tube having fluorescent elements arranged, for example, in the form of dots, the color tube cannot be used as it is, and in case of the color picture tube having dots or stripes of fluorescent elements the image quality cannot be improved by increasing the frequencies of the primary color signals.

In other words, the conventional color picture tube have the disadvantage that once the dots or parallel stripes of fluorescent elements have been designed for a type utilizing a specific number of rasters or specific frequencies of color signals, the color picture tube cannot be applied to other types. An additional disadvantage of the conventional color picture tubes is that, since the dots or stripes of fluorescent elements are arranged with a greater interval and size than the size of the fluorescent material proper, the image quality is substantially degraded in respect of sharpness even when they are used under normal conditions, i.e., with a prescribed number of rasters and prescribed frequencies of color signals.

SUMMARY OF THE INVENTION

The present invention contemplates the provision of a color picture tube which does not require the fluorescent dots or parallel fluorescent stripes which have been essential for the conventional color picture tubes.

Namely, according to the present invention a luminous body common for all of the three primary colors is used at the image receiving portion. Therefore, there are the advantages that the shadow mask in the conventional shadow mask type color tube, the color grid in the conventional chromatron tube, the secondary electron emitting material in the conventional apple tube or the aperture grill in the "Trinitron" tube becomes unnecessary, and that one color picture tube can be used as it is in a color television process in which the frequencies of the color signals are increased or the number of rasters in increased to improve the image quality.

Attempts to display color images on cathode ray tubes which do not comprise a fixed pattern of fluorescent dots or fluorescent stripes mentioned above, are well known as described in the Report of T. E. Sisneros et al. carried in "Journal of The Society for Information Display," 1970, Vol. 7, No. 4, page 33. These attempts consist in (i) a method in which the difference in depth of penetration of electrons into a fluorescent element under acceleration voltage is utilized and (ii) a method in which the fact that the luminous efficiency of fluorescence depends upon electron current density is utilized. The method (i) comprises laminating different fluorescent materials in a plurality of layers and modulating the electron accelerating voltage according to a color signal, whereby the fluorescent layer corresponding to each color signal is eliminated. In this method, however, the accelerating voltage is variable, for example, in the range from 6 to 16 KV and it is very difficult to modulate such a high accelerating voltage as mentioned above by the high frequency as required for the reproduction of television images. On the other hand, the method (ii) comprises forming a single layer of a mixture of fluorescent materials the dependencies on electron current density of the luminous intensities of which are different from each other, and varying the electron current density according to a color signal to emit the color light. In this method, however, while it has been established that the color of the fluorescent light is variable according to the color signal, there still remain the problem as to how, in a fluorescent layer consisting of given types of fluorescent materials mixed at a specific mixing ratio, the lightness of the fluorescent light can be varied while maintaining the color thereof unchanged. Namely, an optional combination of color and lightness can hardly be obtained and hence the reproduction of ordinary color images is difficult.

The present invention has been achieved based on a technical concept completely different from that of the above described conventional color image display devices, as will be clearly understood from the foregoing detailed description on the embodiment of the invention.

DESCRIPTION OF THE PREFERRED EMBODIMENTS

Figure 1:
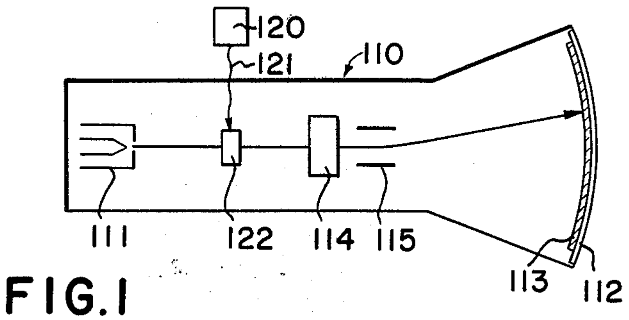
FIG. 1 is a longitudinal sectional view of a cathode ray tube for explaining the basic principle behind the present invention.

The present invention will be described in detail hereinafter with reference to the drawing.

FIG. 1 illustrates the principle of the invention in which is applied the phenomenon of modulation of electron wave by light wave and demodulation of the light wave from the modulated electron wave. In FIG. 1, reference numeral 110 designates a vacuum tube having a single electron gun 111 disposed therein, and 120 designates a light source to emit a monochromatic light beam 121, the wave length of said monochromatic light beam 121 being represented by $\lambda$ and the frequency thereof by $\nu$. Reference numeral 122 designates a modulating medium for modulating the electron wave by light wave. The modulating medium 122 is illuminated by the light wave 121 and the electron beam emitted from the electron gun 111 penetrates therethrough. An image screen (an image receiving layer) 113 provided on the inner surface of a transparent face plate 112 is made of a non-fluorescent material of the type which does not emit a fluorescent light even when subjected to impingement of the electron beam penetrating through the modulating medium 122 while said modulating medium 122 is not illuminated by the light wave 121. The term "non-fluorescent screen" as used herein refers to such a screen which does not emit a fluorescent light even when subjected to bombardment of electrons, if said electrons are merely accelerated as by an electrostatic field.

While the modulating medium 122 is being illuminated by the light wave 121, a field of the light wave $\nu$ is generated within said modulating medium. The electron beams picks up the oscillation of the light wave $\nu$ during passage through the modulating medium 122 and releases the oscillation of $\lambda$ on the non-fluorescent image screen 113, causing said image screen to emit a light of the wave length $\lambda$. For instance, when the electron beam is horizontally and vertically deflected in the same manner as in the conventional television processes by two deflectors 114, 115 the deflecting directions of which are perpendicular to each other, an electron beam spot or a bright spot moves on the image screen 113 while forming a raster. The brightness of the bright spot on the image screen 113 may be modulated by modulating the flow rate of the electron beam discharged from the electron gun in response to a brightness signal of the television or by modulating the light wave 121. Such brightness modulation will be described in detail later in the explanation of FIG. 2 and the description of the embodiment shown in FIG. 3 of the color image display device of the invention. A color television image can be obtained by selecting several values of $\lambda$ adapted to obtain the color image and performing the same thing as described above on these values of $\lambda$ within one and the same tube.

The present invention can be applied not only to color television picture tubes but also to general devices for displaying color image signals. Further, the number of color elements necessary for reproducing a color image is not necessarily limited to 3 but may be optional.

As may be apparent from the basic principle of the invention explained above with reference to FIG. 1, the color on the image screen corresponds to the color of the light wave which has modulated the electron beam impinging upon said screen. Therefore, the material of the image screen can be commonly used for the respective colors and it is unnecessary to arrange several kinds of fluorescent elements in a complicated pattern, as has been practiced in the conventional color picture tubes. The color image display device of the instant invention has the excellent advantage that it is applicable to any frequency of color signal and any number of rasters.

Figure 2:
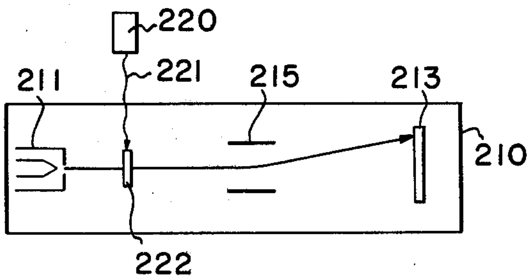
FIG. 2 is a longitudinal sectional view of an experimental setup used for corroborating the possibility of the principle of the invention.

Referring to FIG. 2, there is shown one form of experimental setup. Reference numeral 210 designates electron beam means whose accelerating voltage is 60 KW, and 220 designates ruby laser means. Reference numeral 222 designates a monocrystal thin film of $Al_2O_3$ having a thickness of about 1,000 A and placed in a position to permit the electron beam to penetrate therethrough in the thickness-wise direction. Reference numeral 221 designates the output light of the ruby laster means which is a red light having a wave length of 6943 A.

The arrangement was made such that the electrons continuously discharged from the electron gun 211 penetrate through the modulating medium 222 activated by the light wave 221 and constantly impinge upon a polycrystalline $Al_2O_3$ plate 213. The electron current was about 1 $\mu$A.

When the modulating medium 222 was not irradiated by the ruby laser light 221, notbright spot was observed on the surface of the $Al_2O_3$ polycrystalline plate although the electrons impinged upon said surface. However, when the ruby laser light 221 was applied to the modulating medium 222 in the form of pulses having a duration of about 1 millisecond while causing the electrons to constantly impinge upon the $Al_2O_3$ polycrystalline plate, a red color light, i.e., a light of the same color as the color of the ruby laser light, was observed emanating from the surface of the $Al_2O_3$ polycrystalline plate 213 in the form of pulses.

The peak power of the pulse-like ruby laser light was about 5 KW. The pattern of the emanating red light coincided exactly with the pattern of fluorescence formed by the irradiation of the electron beam on a fluorescent screen which had been placed in the position of the $Al_2O_3$ polycrystalline plate upon removing said plate. The bright spot of the red light on the $Al_2O_3$ polycrystalline plate 213 moved according to the electron beam deflecting signal applied to the deflector 214. This indicates that the electrons carry the red light information. The lightness of the red light on the $Al_2O_3$ polycrystalline plate 213 increased with the intensity of the ruby laser light 221 increasing. The ruby laser light 221 was projected in a direction at right angles to the electron beam. The brightness of the bright spot on the $Al_2O_3$ polycrystalline plate was highest when the electric vector of the deflected straight laser light was in the same direction as the proceeding direction of the electron beam, and decreased with the angle of said electric vector to said electron beam proceeding direction increasing. Thus, by rotating the laser light deflecting plane, the modulation in brightness of the bright spot on the $Al_2O_3$ polycrystalline plate 213 was possible.

The phenomenon in which the electron wave is modulated by the light wave as described above is largely attributable to the use of a laser as a new light source, and it can be said that by the use of the laser as light source, a light wave field of very high energy density can be obtained which has not been obtainable with the conventional light sources.

The modulation and demodulation of an electron wave by light wave is possible not only for a red light such as ruby laser light, but also for a blue light, and this has been confirmed by H. Schwarz and H. Hora. Namely, H. Schwarz and H. Hora report on pages 349 – 351 of "Applied Physics Letters," 1969, Vol. 15, No. 11 that when an electron beam accelerated under an accelerating voltage of 50 KV was passed through the aforesaid $Al_2O_3$ monocrystal thin film having a thickness of 600 – 2000 A while irradiating said thin film by an output light ($\lambda = 4880$ A) of an argon ion laser and then caused to impinge upon a $Al_2O_3$ polycrystalline body, a blue color light, i.e., a light of the same color as the color of the output light of the argon ion laser, was observed emanating from said polycrystalline body, and that the brightness of said blue color light could be modulated by varying the angle of the direction of the deflected light wave to the proceeding direction of the electron beam.

Hereinbefore, the principle of the present invention and the experimental result proving the possibility of said principle have been described. Now, embodiments of the color image display device according to the present invention will be described.

Figure 3:
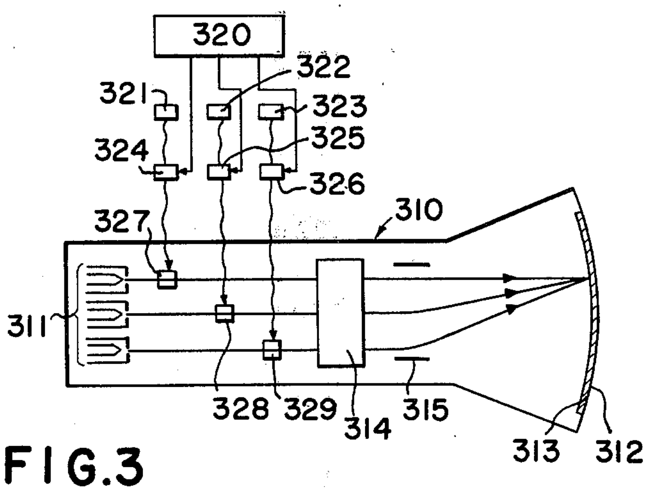
FIG. 3 is a longitudinal sectional view diagrammatically showing an embodiment of the color image display device according to the invention.

FIG. 3 shows an embodiment of the color image display device according to the invention. Reference numeral 310 designates a vacuum container having disposed therein three electron guns each relating with one of the three primary colors R, G and B.

On the inner surface of a transparent face plate 312 is provided a non-fluorescent image receiving layer 313 which serves as image screen.

The electron beams from the three electron guns are concentrated at one point on the non-fluorescent screen 313 by a suitable concentrating member. The three electron beams scan the surface of the screen 313 in the shape of rasters while being concentrated at one point on said screen by horizontal and vertical deflecting members 314, 315. Reference numerals 321, 322 and 323 respectively designate light sources to emit high power monochromatic lights whose wave lengths are represented by $\lambda R$, $\lambda G$ and $\lambda B$ respectively. A practical example of the monochromatic light source 321 is a 10 W krypton laser whose output light has a wave length of 6471 A. Practical examples of the monochromatic light sources 322 and 323 include 10 W argon ion lasers and preferably, those having wave lengths of the output lights of 5145 A and 4880 A respectively are selectively used. Reference numerals 327, 328 and 329 designate modulating media for modulating the electron waves emitted from the electron guns 311 by the lights of the wave lengths of $\lambda B$, $\lambda G$ and $\lambda B$ respectively. For these modulating media, a $Al_2O_3$ monocrystal thin film for example is suitably used but $SiO_2$ monocrystal thin film may also be used. Reference numerals 324, 325 and 326 respectively designate light modulators for modulating the light waves of the wave lengths of $\lambda R$, $\lambda G$ and $\lambda B$ by the R, G and B color signals generated from a color signal generator 320 provided in a color television receiving set. Practically, lithium tantalate ($LiTaO_3$) is suitable for use as the light modulators. Lithium tantalate is capable of modulating light waves to such a degree that the contrast of the light modulation exceeds 1/100, and there have been developed lithium tantalate modulators which are responsive to about 100 MHz which is greater by far than several MHz to which the modulators in the ordinary television processes are required to be responsive.

Now, the manner of modulating the brightness of the light spot on the non-fluorescent image screen will be described in detail. The brightness of the light spot can be modulated by modulating the electron currents corresponding to the respective colors or the light waves illuminating the modulating media 327, 328 and 329 respectively. Namely, when the electron modulating method is employed, it is preferable to control the flow rates of the electron currents by means of the color signals of the three primary colors. On the other hand, when the light wave modulating method is employed, the intensities of the lights passing through the modulating media 327, 328 and 329 may be modulated by the ordinary light modulators 324, 325 and 326 respectively which utilize the technique of optoelectronics, or the lights passing through the light modulators 324, 325 and 326 may be previously deflected into straight lights respectively and the deflecting planes of said deflectors are rotated. It will be obvious that for modulating the intensities of the light waves, a method in which the lights are modulated within the respective light sources, can be employed besides the method in which the lights are modulated subsequent to emanation from the respective light sources.

In summation, the embodiment shown in FIG. 3 of the color image display device according to the present invention operates in the following manner: Namely, the electron beams emitted from the three electron guns each corresponding to each of the three primary colors are concentrated at one point on the non-fluorescent screen (image receiving layer) and the lighted spot on said non-fluorescent screen emits a light of the same color as the color of the light projected onto the modulating media. The brightness of the color light is modulated by the intensities of the electron beams or the intensities of the light waves applied to the modulating media or the directions of the light wave defelcting planes. The spot on the screen at which the electron beams are concentrated is caused to move in the shape of rasters by a method conventionally used in the television processes and the electron currents or light waves are modulated by the color signals, whereby a color television image can be obtained on the screen.

Figures 4, 5, 6:
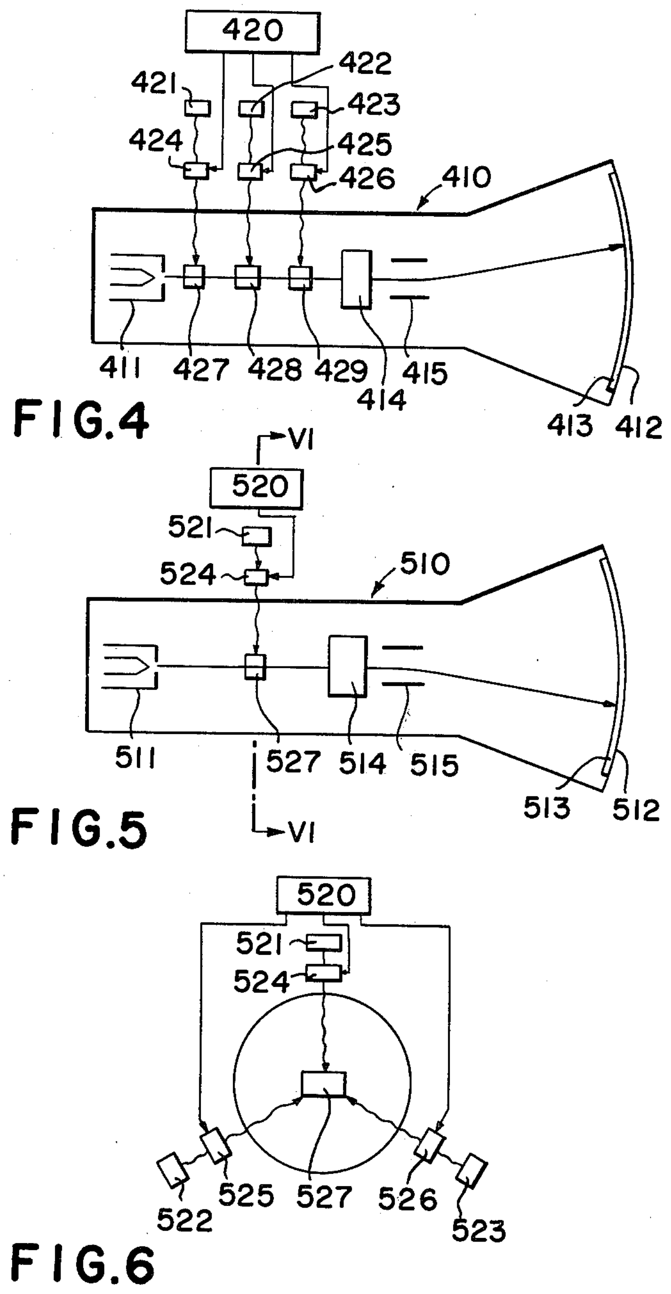
FIG. 4 is a longitudinal sectional view diagrammatically showing another embodiment of the color image display device of the invention.
FIG. 5 is a longitudinal sectional view similarly showing diagrammatically still another embodiment of the color image display device of the invention.
FIG. 6 is a vertical sectional view taken of the device shown in FIG. 5 taken on the line VI—VI of FIG. 5.

FIG. 4 shows another embodiment of the color image display device according to the present invention. In this embodiment, one electron gun 411 common for all the three primary colors is mounted in a vacuum container 410 and electron beam modulating media 427, 428 and 429 are provided each for each of the three primary colors. The electron current is maintained at a constant value and light modulators are actuated by color signals from a color signal generator 420 respectively.

Reference numerals 412 – 415 and 421 – 426 designate members which respectively correspond to the members 312 – 315 and 321 – 326 of the device shown in FIG. 3.

FIGS. 5 and 6 show still another embodiment of the color image display device of the invention. In this embodiment, an electron gun 511 and a modulating medium 527 are common for all the three primary colors. Light modulators 524, 525 and 526 are actuated by color signals from a color signal generator 520 respectively, with the electron current being maintained at a constant value.

FIG. 6 is a sectional view of the device taken along the line VI—VI of FIG. 5. Members 512 – 515 and 521 – 524 shown in FIGS. 5 and 6 correspond to the members 312 – 315 and 321 – 326 of the device shown in FIG. 3 respectively.

It will be obvious from the foregoing description that the color images referred to in the present invention include monochromatic images formed by a signal electron gun.

As described above, in the color image display devices of the invention it is only necessary to provide on the baciside of the face plate a layer of polycrystalline $Al_2O_3$ or $SiO_2$ as image screen and it is unnecessary to arrange fluorescent dots or stripes in a complicate pattern as is in the conventional color picture tubes. In the conventional color picture tubes, the color reproducibility has been substantially degraded by varying the frequencies of the color signals where the picture tubes are of the type having fluorescent stripes, and by varying either the frequencies of the color signals or the number of rasters where the picture tubes are of the type having fluorescent dots. Therefore, these color picture tubes have had the disadvantage that they can receive only the color television signals of a certain type of television process to produce quality color images. As contrasted thereto, the color image display devices of the instant invention have such an excellent advantage that the frequencies of the color signals and the number of rasters can be set at optional values.

For obtaining television images of high information denisty, it becomes necessary to increase the number of rasters and it has been practiced to increase the number of rasters from 525 per frame to, for example, about 1512 per frame. In this case, the color image display devices of the invention can be commonly used for television processes employing different numbers of rasters and enable images of excellent quality to be obtained easily.

It is also to be noted that according to the present invention, since there is no necessity for arranging the fluorescent elements by using a high photographical technique, an image screen of large area can be easily produced.

I claim:

1. A color image vacuum tube display apparatus, comprising:

electron beam generating means for generating one electron beam;

a plurality of monocrystal films disposed in series in the path of said one electron beam;

a plurality of light sources for generating coherent light beams;

modulating means for modulating said coherent light beams;

means coupled to said modulating means for generating a modulating signal, said coherent light beams being modulated as a function of said modulating signal, the modulated light beams impinging on corresponding ones of said monocrystal films to modulate said electron beam;

a face disposed in the path of said modulated electron beam to produce an image on a polycrystal film having a color which is determined by the modulated coherent light beams impinging on said monocrystal films; and deflection means for scanning said modulated electron beams over said face plate.

2. A color image displaying device as defined in claim 1 wherein said poly-crystal film is poly-crystalized $Al_2O_3$.

3. A color image displaying device as defined in claim 1 wherein said mono-crystal films are thin films of single crystal of $Al_2O_3$.

* * * * *